UNITED STATES PATENT OFFICE 2,723,869
Patented Nov. 15, 1955

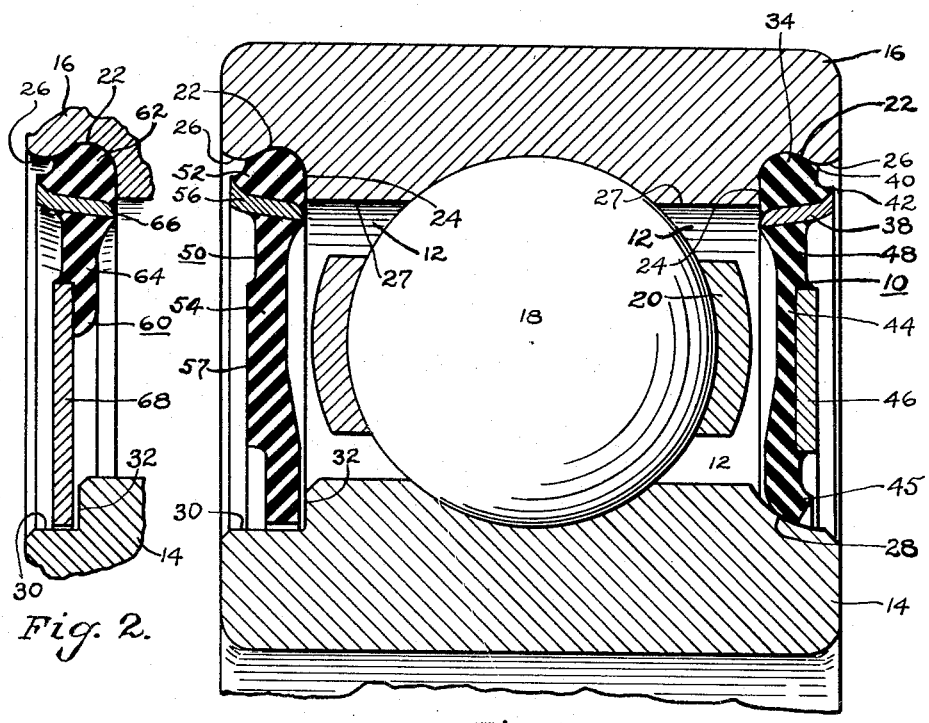

2,723,869

DEMOUNTABLE CLOSURE

Leland D. Cobb, Forestville, Conn., assignor to General Motors Corporation, Detroit, Mich., a corporation of Delaware Application January 26, 1952, Serial No. 268,450

9 Claims. (Cl. 286—11)

This invention relates to a demountable closure for closing the space between a pair of relatively rotatable members and particularly to a demountable closure or seal for maintaining lubricant within an antifriction bearing and for preventing the ingress of dirt and other deleterious material into the bearing.

It has been common practice to permanently install a seal at the end of an annular lubricant chamber between antifriction bearing race rings for permanently retaining a small amount of lubricant within the bearing. However, when such a bearing is subjected to high operating temperatures and/or extended periods of overload, this lubricant oxidizes, hardens and provides insufficient lubrication resulting in bearing failure. These permanently installed seals are ruined even when carefully removed, and frequently the removal of such a seal so damages the bearing as to require bearing replacement. Consequently, the cleaning out and replacement of the lubricant in a permanently sealed bearing is usually impractical. These bearings have been usually operated until failure and much time has been lost due to bearing replacement. Recently, some seals have been devised that may be demountably located in a sealing position. However, these last mentioned seals, which are ordinarily cumbersome, multipart arrangements, are difficult to remove and are usually so damaged upon their removal that much repair time is again required to dismantle machinery and install a new seal.

An object of this invention is to provide an improved, easily constructed, inexpensive, unitary demountable closure which may be repeatedly snapped into and out of operating position without damage to the closure or the members with which it is associated. A further object is to provide an improved demountable seal installed between a pair of anti-friction bearing race rings and which is in resiliently deformable sealing engagement with at least one of the race rings.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 1 is a cross sectional view of a portion of an antifriction bearing showing two related forms of demountable closures.

Figure 2 is a fragmentary cross sectional view illustrating another form of demountable closure at the end of a lubricant chamber.

Figure 3 is in enlarged fragmentary cross section of the closure mounted in the left end of Figure 1.

Figure 4 is an enlarged fragmentary cross sectional view of the closure mounted in the right end of Figure 1.

Figure 5 is a side elevation of the bearing with the closure of Figure 4.

The closure, as 10, may be repeatedly mounted and removed without damage in closing relation across the end of an annular lubricant chamber 12 between a pair of relatively rotatable members, as antifriction bearing inner and outer race rings 14 and 16 which have the usual raceways that receive rolling elements, as balls 18 guided by a cake or separator 20. Each end of the race ring 16 has an annular seal-receiving groove 22 that is transversely curved between an annular shoulder 24 and a transversely rounded annular land 26 having a diameter intermediate between that of the bottom of the groove and that of an inner cylindrical wall 27 of this race ring. The right end of the inner race ring 14 has a transversely curved annular notch 28 and the left end of this race ring terminates in an annular notch formed by a peripheral surface 30 (herein shown cylindrical) and a generally radial annular shoulder 32.

In the seal at the right hand end of Figure 1 and in Figure 4, a resiliently deformable annular bead 34 having a flat faced annular wall 35 and a transversely rounded peripheral wall 37 is intimately bonded, as by vulcanization or cementing, to the periphery of a slightly flexible reinforcing ring or sleeve 38 composed of a suitable material as sheet metal. The width of the bead 34 slightly exceeds that of the seal-receiving groove 22 and the diameter of the bead exceeds that of the groove 22 so that the bead deformably and yieldably seats within the groove in tightly sealing relation against the groove walls and the shoulder 24 thus locating the closure 10 in a predetermined position both axially and radially. When seated in this position, a deformed lip 40 of this bead engages the merging portions of the land 26 and the groove 22 to axially urge the bead face 35 into tightly seated engagement with the shoulder 24. The reinforcing ring 38 is preferably formed as a conical sleeve extending transversely of the bead 34 and having substantially coaxial inner and outer peripheries, the smaller sleeve end being radially spaced from the wall 27 to avoid sleeve interference with the shoulder 24. This ring 38 axially extends throughout the width of the bead 34 and terminates at its larger end in a radially outwardly turned annular lip 42. Due to the freely yieldable nature of the bead 34 and the slightly flexible character of the reinforcing ring 38, the bead will deformably and sealingly seat in the groove 22 even if the bead or the groove or if both the bead and groove are slightly out of round.

A yieldable disc 44 of resiliently deformable material is permanently bonded as by vulcanization or cementing to the inner periphery of the reinforcing ring 38 and radially extends across the lubricant chamber 12, the inner periphery of the disc 44 bending outwardly and forming an annular lip 45 in yieldably wiping sealing engagement with the curved face of the notch 28. A generally flat annular reinforcing shield 46, of suitable rigid material as steel and radially spaced from the ring 38 and the lip 45, is bonded to the disc 44 as by vulcanization or cementing to stiffen the lateral yieldability of the closure member 10. The bead 34 and the disc 44 may be composed of various rubber-like materials which will not deteriorate or appreciably change resiliency in the presence of heat, light and bearing lubricants. One satisfactory rubber-like material for the members 34 and 44 comprises a resilient vulcanized synthetic rubber containing a polymerization product of butadiene and acrylic nitrile. Since a different extent of resiliency is usually required for the disc 44 from that of the yieldably deformable bead 34, a different type or composition of synthetic rubber may be employed for these two portions of the sealing member 10 which are bonded to the reinforcing ring 38. To further strengthen the closure 10, the inner end of the ring 38 may taper to an edge past which the rubber-like materials of members 34 and 44 may flow and bond together during manufacture.

An annularly extending throat portion 48 of the disc 44 between the periphery of the reinforcing shield 46 and the reinforcing ring 38 is precisely controlled in thickness to provide the desired lateral sealing pressure of the lip 45 in its wiping engagement with the rounded face of the notch 28. The combined resilient yieldability of the throat 48 and the lip 45 assure an effective sealing engagement of the lip 45 even in the event of misalignment of the race rings 14 and 16. Also, the resiliently yieldable throat 48 compensates for any out of round condition of the bead 34 and/or the reinforcing ring 38 so that an effective sealing relation is maintained. The parts of the closure member 10 are preferably assembled in a mold wherein the synthetic rubber-like material of the members 34 and 44 are vulcanized to and about the reinforcing ring 38 and to the reinforcing shield 46 thus providing a unitary seal or closure structure. Also, the mold is constructed and/or adjusted to precisely regulate the throat 48 to the required thickness.

In mounting the closure 10, the bead 34 is snapped past the land 26 into seated relation in the groove 22 and against the shoulder 24. In removing the closure, a tool, such as a screw driver, is applied against the lip 42 and fulcrumed against the outer end of the land 26. This wedging movement snaps the bead 34 past the transversely rounded land 26 thus providing easy removal of the closure member without injury either to the closure 10 or to the bearing. Hence, the closure may be repeatedly removed and replaced giving easy access to the bearing for cleaning and relubrication while the bearing remains in its operative location, it being only necessary to stop relative rotation of the bearing race rings.

In the embodiment illustrated at the left hand end of Figure 1 and in Figure 3, a closure, generally indicated at 50, has a bead 52 and a disc or shield portion 54 composed of suitable synthetic rubbers and bonded to an intermediate conical reinforcing ring 56, the bead being resiliently and deformably seated in a groove 22, all in general accordance with the embodiment at the right hand end of Figure 1. The shield portion 54 radially extends into proximity with the peripheral surface 30 and with the shoulder 32, and an intermediate annulus 57 of the shield portion 54 is thickened to serve a similar purpose as the reinforcing shield 46. The closure 50 may be assembled and vulcanized together as a unit handling structure in a hot molding operation.

In the embodiment of Figure 2, a closure or shield 60 has a bead 62 and an annular portion 64 of suitable synthetic rubbers having the required resiliency, these parts being bonded to an intermediate conical reinforcing ring 66 and the bead being demountably received in a groove 22 all in the general manner as explained with reference to the closure at the right hand end of Figure 1. A radially extending annular shield 68, as a flat metal disc, radially spaced from the reinforcing ring 66 and bonded to the annular portion 64, radially extends into closely spaced relation with the peripheral surface 30 and with the annular shoulder 32. In both of the embodiments of Figure 2 and 3, the reinforcing rings 56 and 66 terminate outwardly in an annular lip which corresponds to the lip 42 to facilitate repeated and easy demounting of the closures 50 and 60 without damage to these closures or to the bearings.

I claim:

1. A unit handling closure arranged to be demountably positioned across the annular lubricant space between a pair of realtively rotatable members one of which has an annular groove opening towards the other member, said closure comprising an inherently deformable annular bead demountably seated in non-rotatable sealing relation against the walls of the groove, a disc of inherently resilient rubber-like material radially extending the major portion of the distance across the lubricant chamber, and a reinforcing sleeve axially extending completely across the bead and separating the bead from said disc, the reinforcing disc being bonded throughout substantially its length to the bead and holding said bead in deformably compressed seated engagement with the walls of said groove, and said disc being peripherally bonded to the sleeve.

2. A unit handling closure for demountable positioning across an annular lubricant chamber between a pair of relatively rotatable members one of which has an annular groove, said closure comprising an inherently resilient annular bead demountably and non-rotatably seated in said groove, an inherently resilient disc extending the major portion of the distance across the lubricant chamber and sealingly engaging one of the relatively rotatable members, a reinforcing sleeve adjacent said groove and bonded to the periphery of the disc and peripherally bonded substantially throughout its length to the bead, said sleeve extending completely across the bead, said bead being compressively received between the reinforcing disc and the groove walls, and the bead and disc being composed of different compositions of synthetic rubbers having different predetermined characteristics of resiliency.

3. In a closure for demountable positioning across an annular lubricant chamber between a pair of relatively rotatable members one of which has an annular groove opening towards the other member, an annular inherently resilient rubber-like bead demountably and deformably seated in non-rotatable sealing engagement against the walls of the groove, a reinforcing sleeve axially extending completely across the bead and peripherally bonded to the bead, the bead being compressively received between the reinforcing sleeve and the walls of said groove, a disc of inherently resilient material peripherally bonded to the sleeve and radially extending alongside the lubricant chamber, and a lip on the reinforcing sleeve projecting beyond the side of the bead to facilitate removal of the closure from the groove.

4. In a closure for demountable positioning across an annular lubricant chamber between a pair of relatively rotatable members one of which has an annular groove opening towards the other member, an annular inherently resilient bead in demountably seated non-rotatable sealing engagement against the walls of the groove, a conical reinforcing sleeve axially extending across the bead and peripherally bonded to the bead, the bead being compressively received between the reinforcing sleeve and the walls of said groove, a disc of inherently resilient material separated from the bead by said sleeve and peripherally bonded to the sleeve and radially extending alongside the lubricant chamber, and an annular lip on the sleeve projecting beyond the bead to facilitate demounting of the closure.

5. In a closure for demountable positioning across an annular lubricant chamber between a pair of relatively rotatable members one of which has an annular groove opening towards the other member, an annular resiliently deformable bead demountably seated in sealing engagement against the walls of the groove, a reinforcing sleeve axially extending across and peripherally bonded to the bead, a disc of inherently resilient material bonded to the sleeve and separated from the head by said reinforcing sleeve, and a rigid annular reinforcing shield bonded to the disc in radially spaced relation to the reinforcing sleeve and radially extending alongside the lubricant chamber.

6. A unit handling closure for demountable positioning across an annular lubricant chamber between a pair of relatively rotatable members one of which has an annular groove opening towards the other member, said closure comprising an annular resiliently deformable bead demountably seated in sealing engagement against the walls of the groove, an inherently resilient disc extending the major portion of the distance across the lubricant chamber and having an annular lip portion for sealing engagement with said other relatively rotatable member, a conical reinforcing sleeve adjacent to said groove and peripherally bonded to the bead and to the disc, the reinforcing sleeve extending across the bead and separating the disc from the bead, and an annular shield bonded at one side to said disc and laterally projecting from the disc in spaced relation to the reinforcing sleeve.

7. In a closure for demountable positioning across an annular lubricant chamber between a pair of relatively rotatable members one of which has an annular groove opening towards the other member, an annular resiliently deformable bead demountably seated in sealing engagement with the walls of the groove, a reinforcing sleeve axially extending across and peripherally bonded to the bead throughout the entire width of the bead, an inherently resilient disc peripherally bonded throughout its width to the sleeve and extending across the lubricant chamber, the disc and the bead being held in radially spaced relation to each other by said reinforcing sleeve, a disc lip in sealing engagement with said other relatively rotatable member, and an annular shield bonded to the outer side of the disc in radially spaced relation to the sleeve and to said lip.

8. In a closure for demountable positioning across an annular lubricant chamber between a pair of relatively rotatable members one of which has an annular groove opening towards the other member, an annular resiliently deformable bead demountably seated in sealing engagement with the walls of the groove, a reinforcing sleeve axially extending across and peripherally bonded to the bead, a disc of inherently resilient material peripherally bonded to the sleeve and extending across the lubricant chamber, the reinforcing sleeve extending completely across the bead and separating the disc from said bead, said reinforcing sleeve having an annular lip projecting laterally and radially outwardly from said disc, an annular disc lip sealingly engaging said other relatively rotatable member, and an annular flat shield bonded to a side of the disc in radially spaced relation to the sleeve and spaced from said disc lip.

9. In a closure for demountable positioning across an annular lubricant chamber between a pair of relatively rotatable members one of which has an annular groove opening towards the other member, an annular resiliently deformable bead demountably seated in sealing engagement with the walls of the groove, a conical reinforcing sleeve adjacent the opening of the groove and axially extending completely across the bead and peripherally bonded to the bead, the larger end of the sleeve being outwardly of the lubricant chamber and terminating in an annular lip, a disc of inherently resilient material radially spaced from the bead by said reinforcing sleeve, the disc being peripherally bonded throughout its width to the sleeve and extending radially across the lubricant chamber, an annular disc lip in sealing engagement with said other relatively rotatable member and a flat annular shield bonded to the disc and radially spaced from the sleeve and from the disc lip.

References Cited in the file of this patent
UNITED STATES PATENTS

| | | |
|---|---|---|
| 2,202,769 | Brodin | May 28, 1940 |
| 2,275,325 | Searles | Mar. 3, 1942 |
| 2,401,539 | Benson | June 4, 1946 |
| 2,417,390 | Winkeljohn | Mar. 11, 1947 |
| 2,467,049 | Peterson | Apr. 12, 1949 |
| 2,606,779 | Jagger | Aug. 12, 1952 |